United States Patent [19]
Hearn

[11] 3,728,614
[45] Apr. 17, 1973

[54] OPTICAL MAGNETOMETER USING A DEPUMPING SIGNAL FORMED BY FREQUENCY MODULATING THE OUTPUT OF A VARIABLE FREQUENCY OSCILLATOR WITH TWO ALTERNATING FIXED FREQUENCY OSCILLATORS

[75] Inventor: Daniel P. Hearn, Richardson, Tex.

[73] Assignee: Atlantic Richfield Company, New York, N.Y.

[22] Filed: June 10, 1971

[21] Appl. No.: 151,791

[52] U.S. Cl. ............324/0.5 R, 324/0.5 E, 324/0.5 F
[51] Int. Cl. ............................................G01r 33/08
[58] Field of Search .....................324/0.5 E, 0.5 F, 324/0.5 R

[56] References Cited

UNITED STATES PATENTS

| | | |
|---|---|---|
| 3,524,128 | 8/1970 | Hearn ................................324/0.5 F |
| 3,467,856 | 9/1969 | Hearn ................................324/0.5 F |
| 3,513,383 | 5/1970 | Hartline et al. ....................324/0.5 F |
| 3,584,292 | 6/1971 | Dehmelt ............................324/0.5 E |

Primary Examiner—Robert J. Corcoran
Attorney—Blucher S. Tharp, Robert E. Lee, Jr., M. David Folzenlogen and Roderick W. Mac Donald

[57] ABSTRACT

An optical magnetometer having a radiation source, an absorption cell, an RF signal generator, and a radiation detector. Radiation from said source is directed through the absorption cell to the radiation detector which measures the intensity. The generator is adjusted by feedback from the detector until the radiation absorbed by the cell is maximized. The RF signal generator comprises a voltage controlled oscillator having one output frequency modulated for depumping the cell and another output unmodulated for measuring the depumping frequency. The RF signal applied to the cell when maximum absorption is realized is a measure of the strength of the magnetic field in which the cell is positioned.

13 Claims, 2 Drawing Figures

PATENTED APR 17 1973    3,728,614

INVENTOR:
DANIEL P. HEARN

Robert E. Lee Jr.
ATTORNEY

OPTICAL MAGNETOMETER USING A DEPUMPING SIGNAL FORMED BY FREQUENCY MODULATING THE OUTPUT OF A VARIABLE FREQUENCY OSCILLATOR WITH TWO ALTERNATING FIXED FREQUENCY OSCILLATORS

BACKGROUND OF THE INVENTION

The present disclosure relates to an improvement in optical magnetometers and, more particularly, to a helium magnetometer having an improved depumping oscillator using a mixer type voltage controlled oscillator.

Among the more recently developed devices for monitoring magnetic fields is the optically pumped magnetometer. Typically such a device includes a source of resonant radiation, a radiation absorption cell through which the radiation is directed, RF signal generating means for depumping the cell, and radiation detector means for measuring the intensity of the radiation that passes through the cell. The amount of absorption of radiation by the cell is a function of the frequency of the applied RF signal and is determined by monitoring the output of the radiation detector. A feedback system from the detector to the RF signal generating means causes the depumping signal frequency to vary until absorption is maximized. The RF signal frequency at maximum absorption is a measure of the ambient magnetic field in which the cell is positioned.

A problem with previous magnetometers is that they have been faced with a compromise situation. If the magnetometer uses field sweep generated by a coil system around the absorption cell, the unmodulated depumping frequency can easily be determined by conventional means; however, the detector will have a variable amount of sweep as it moves or rolls in the earth's field. This in combination with the asymmetry in the resonance peak acts to cause changes in reading or a "noise on the output" due to motion.

The alternative is to use FM sweep of the voltage control oscillator. This gives a frequency sweep which is set by electrical signals and is not changed by detector position or motion; however, it is difficult to determine the "center frequency" of a signal that is in constant variation with better than moderate accuracy. Thus, the average depumping frequency will depend upon when, in time, the counter gate opens and closes. It also depends upon the relationship between the period of the modulation signal and the gate time and upon the point in the depumping frequency cycle where the switching takes place.

All of these sources of error except the last may be reduced to negligible values using the teachings of applicant's U.S. Pat. No. 3,467,856. Unfortunately, however, the disturbance to the voltage controlled oscillator caused by rapidly switching its frequency causes a small but measurable error in frequency measurements.

Consequently, it would be desirable if in some way a depumping system could be set up in which the amount of sweep is not changed by detector position or motion and which, at the same time, provides an unmodulated single frequency output to allow precise measurement of the depumping frequency and determination of magnetic field strength.

SUMMARY OF THE INVENTION

The present invention is an apparatus and method of improving the performance of an optically pumped magnetometer. The RF signal generating means includes a voltage controlled oscillator provided with two outputs. One output is frequency modulated for depumping the magnetometer in optimum fashion, and the other output, which is unmodulated and contains a single frequency, goes to a frequency counter for measuring the depumping frequency.

First and second crystal oscillators are provided for producing preselected constant frequency signals. Switching means connected to the outputs of the crystal oscillators alternately is keyed to sample the two frequencies at the desired sweep rate. A signal mixer is provided having inputs from the voltage controlled oscillator and the switching means. The output from the mixer goes through a band-pass filter that removes undesirable frequency components. The filtered signal which is frequently modulated goes to the depumping coil where it is applied to the absorption cell. Sweep is independent of detector position or motion.

The sum of the signal measured by the frequency counter and the average FM signal applied to the mixer (i.e. average signal from the two crystal oscillators) is indicative of the magnetic field in which the cell is positioned. The latter is constant while the former is a variable; however, since the input to the frequency counter is unmodulated, its frequency can be determined to any desired accuracy.

DETAILED DESCRIPTION OF THE INVENTION

Figure 1:
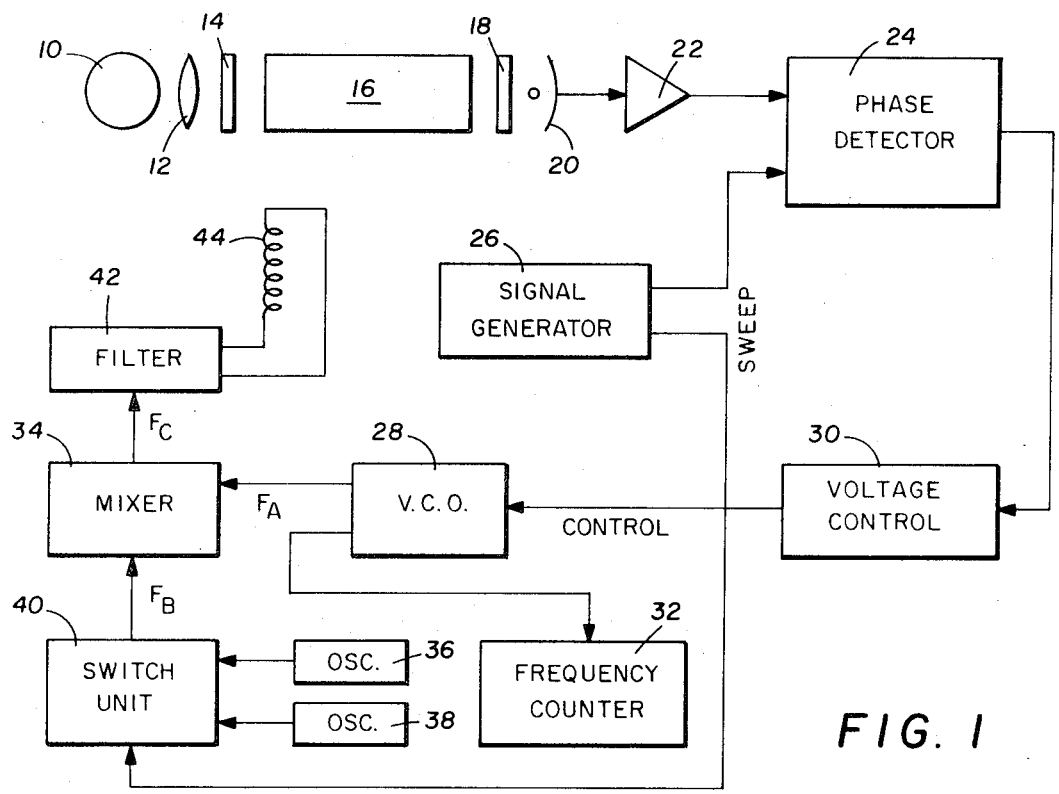
FIG. 1 is a block diagram of an optically pumped magnetometer system according to the present invention.

FIG. 1 depicts an optically pumped magnetometer utilizing the depumping oscillator system invented by applicant. Radiation from source 10, which by way of example could be a helium discharge lamp, passes through lens 12, circular polarizer 14, and into radiation absorption cell 16. Absorption cell 16 is filled at a reduced pressure with a gas which is excited to the metastable state, for example by means of energizing electrodes (not shown). If radiation source 10 is a helium lamp, then, by way of example, absorption cell 16 could be filled with helium gas.

Radiation emerging from absorption cell 16 passes through filter 18 to radiation detector 20. Filter 18 is a radiation filter passing a selected wavelength and can be deleted if the signal to noise ratio is acceptable. If radiation source 10 is a helium lamp, then filter 18 is selected to pass the 1.08 $\mu$ wavelength of the helium radiation, and detector 20 must be able to detect the 1.08 $\mu$ wavelength radiation.

The electrical signal output from radiation detector 20 is applied as an input to amplifier 22 which has its output tied to one input of phase detector 24. Signal generator 26 applies a sweep signal to the second input of phase detector 24 and to switch unit 40. Generator 26 might be a square wave generator, a triangular wave generator, a sine wave generator, etc. The output of phase detector 24 is connected to voltage control 30 which in turn connects to the input of voltage controlled oscillator 28. The output from oscillator 28, $F_A$, goes to frequency counter 32 and to double balanced mixer 34. An example of a suitable mixer would be Relcom Model 6A, Relcom, Inc., Palo Alto, Calif.

Crystal oscillators 36 and 38 generate selected frequency signals which are alternately sampled by switch unit 40 and applied to mixer 34 as input $F_B$. Switch unit 40 may be an electronic switch, typically using field effect transistors in a series switching mode. The switching rate is controlled by generator 26 and typically is on the order of 500 times a second. Based on inputs $F_A$ and $F_B$, mixer 34 produces an output signal $F_C$ which has two predominant signals, one which is the sum of $F_A$ and $F_B$ and the other which is their difference. Band-pass filter 42 is designed to pass the summation frequency (i.e. $F_A + F_B$) while rejecting the difference signal. The output of filter 42 is then applied to coil 44 to produce a radio frequency magnetic field which is used to depump cell 16. If desired, it would be possible, of course, to use the difference signal (i.e. $F_B - F_A$) as the depumping signal and reject the summation signal.

By way of specific example, assume that $F_A$ is in the order of 200-500 K Hz and that oscillators 36 and 38 are chosen to emit frequencies of 1,102 and 1,098 K Hz. The average frequency of $F_B$ in this case will be 1,100 K Hz. Therefore, the sum of $F_A$ and $F_B$ obtained by mixer 34 will be between 1,300 and 1,600 K Hz, whereas their difference will be approximately 600-900 K Hz. The former signal is passed by filter 42 and the latter signal is rejected. The magnetic field will have a value proportional to ($F_A + F_B$) times a predetermined constant. Since $F_B$ is already known, only $F_A$ need be measured.

Figure 2:
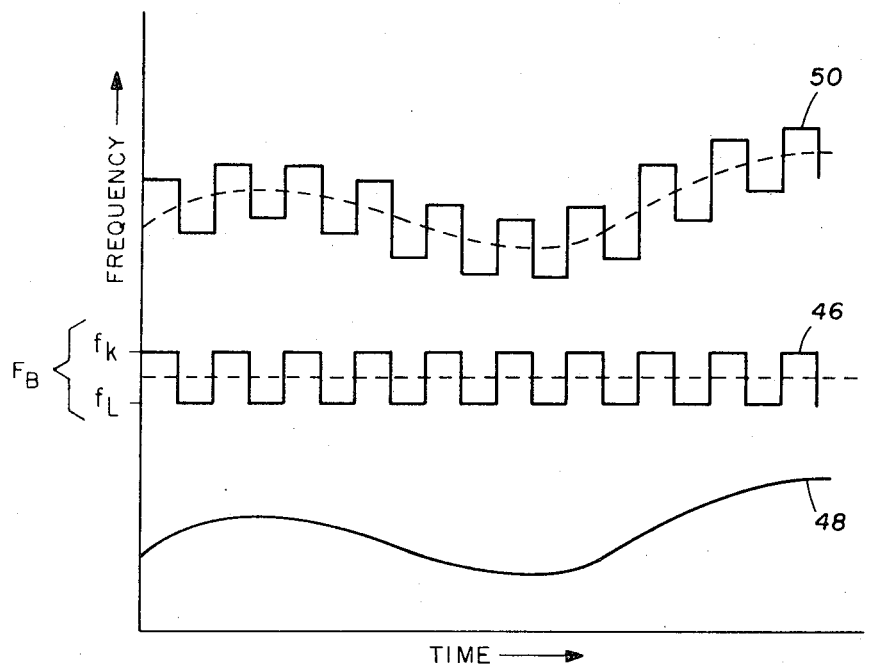
FIG. 2 is a waveform diagram illustrating the invention.

Referring now to FIG. 2, waveforms are shown illustrating the improvement of applicant's invention. Waveform 46 has an average value $F_B$ which is created by switching between two frequencies $f_1$ and $f_k$. A second waveform 48 at a lower frequency than $f_1$ or $f_k$ is combined with waveform 46 to create a new waveform 50 having characteristics identical to waveform 48. This is applied to the depumping coil in order to obtain the freedom from errors due to to orientation or roll inherent in an FM swept system. The frequency of waveform 48 is measured by a frequency counter and this measurement plus $F_B$ is indicative of the magnetic field.

It is well known to those skilled in the art that a signal generated by the addition of a low frequency variable oscillator and a high frequency crystal oscillator has smaller random fluctuation and drift than one generated by a variable oscillator at the output frequency. This principle is widely used in dual conversion radio receivers and precision master oscillators for transmitter frequency control.

An additional advantage, not apparent from these curves, is that the FM output is generated in a manner such that the VCO frequency is not disturbed by the sweep signal. A further advantage is that the output signal of this system has better short term stability and lower drift than prior art systems.

In operation, helium gas within absorption cell 16 is excited to its metastable state and radiation from source 10 is passed through it. Optical pumping occurs with many atoms being raised to excited states. The depumping signal caused by current in coil 44 causes the helium atoms within cell 16 to be placed in other excited states which absorb slightly greater light energy. The frequency of the depumping signal at which absorption is a maximum is indicative of the intensity of the magnetic field in which absorption cell 16 is located. Signal generator 26 causes the frequency output $F_C$ of mixer 34 to switch first below, then above, the frequency of maximum radiation absorption by controlling input $F_B$. The signal applied from radiation detector 20 through amplifier 22 to phase detector 24 includes a component at the sweep frequency. Phase detector 24 detects the sweep frequency signal and provides a control signal for oscillator 28 to control its frequency output $F_A$ so that it is always at the point of maximum absorption of radiation within cell 16. Output signal $F_A$ is measured by frequency counter 32 to any required precision and the magnetic field is directly proportional to the sum of $F_A$ and $F_B$ in the usual relationship of 28.02356 Hz per gamma.

What is claimed is:

1. In an optical magnetometer having source means for the emission of resonant radiation, radiation absorption cell means containing optically excitable atoms having radiation emitted by said source means directed therethrough to produce alignment of said atoms, a generator for producing a sweep signal, RF signal generating means, including a voltage controlled oscillator, connected to a depumping coil for producing a signal which diminishes the alignment of said atoms, radiation detection means for producing an output proportional to the intensity of impinging radiation from the source means which passes through the cell means, and means connected to the said radiation detection means to generate a control voltage to said voltage controlled oscillator relatable to a phase difference between said sweep signal and a component of said sweep signal in the output of said radiation detection means, the improvement in said RF signal generating means comprising first and second crystal oscillators for producing preselected frequency signals, switching means controlled by said sweep signal for alternatively sampling the outputs of said crystal oscillators, and a signal mixer connected to the outputs of said voltage controlled oscillator and said switching means, the output from said mixer going to said depumping coil.

2. Apparatus according to claim 1 where a band-pass filter is connected between said mixer and said depumping coil.

3. Apparatus according to claim 1 where an output from said voltage controlled oscillator goes to a frequency counter.

4. Apparatus according to claim 1 where said optically excitable atoms are helium atoms.

5. A method of signal measurement for optimizing the sensitivity of an optically pumped magnetometer so that a motion independent signal can be generated for depumping the magnetometer while at the same time obtaining an unmodulated signal that can be accurately measured comprising:

a. generating a sweep signal,
   b. generating a control signal based on a phase difference of the sweep signal and a detected field signal, c. using the control signal to drive a voltage controlled oscillator having two outputs, one going to a signal mixer and one going to a frequency counter, d. generating two oscillation signals to be applied alternately to said signal mixer at a particular rate, e. frequency modulating the output from said oscillator in said signal mixer with said alternately applied two oscillation signals, f. using a modulation product from said mixer to depump the magnetometer, and g. using an algebraic sum of the frequency of the signal measured by said frequency counter and the average frequency of the two oscillation signals to measure the depumping frequency.

6. A method according to claim 5 where the output signal from said mixer is filtered to remove undesirable frequency components.

7. A method according to claim 6 where said two alternately applied oscillation signals are keyed to the sweep signal.

8. A method according to claim 6 where the magnetometer is a helium magnetometer.

9. Apparatus, comprising:

an optically pumped absorption cell for generating a signal relatable to the magnetic field therein to be measured, a generator to produce a sweep signal, means for generating two oscillation signals, means controlled by the sweep signal to which the two oscillation signals are applied, for switching between the two oscillation signals to obtain an FM sweep signal, means for generating a variable oscillation signal, means for mixing the variable oscillation signal and the FM sweep signal, to form a magnetic signal applied to said absorption cell, means for detecting a phase difference between the sweep signal and a component thereof in the signal of said absorption cell, and for generating a signal relatable to the detected phase difference and for applying said signal to the variable oscillation signal generating means to change the frequency thereof, and means for indicating the frequency of the variable oscillation signal.

10. The apparatus of claim 9 wherein said optically pumped absorption cell comprises means for emitting resonant radiation, a radiation absorption cell containing optically excitable atoms through which the resonant radiation is directed, thereby producing an alignment of said atoms, and a radiation detector for producing a signal relatable to the intensity of the radiation passing through said cell.

11. The apparatus of claim 10 wherein said means for generating two oscillation signals is two crystal oscillators.

12. Apparatus for measuring a magnetic field comprising:

an optically pumped absorption cell having a light output of variable magnitude relatable to the magnetic field therein to be measured, means for generating and applying a magnetic signal to said absorption cell, means for generating an FM signal comprising two alternating frequencies, means for generating a signal of variable frequency, means for obtaining the algebraic sum of said variable frequency signal and said FM signal comprising two alternating frequencies and applying said sum to said magnetic signal generating and applying means, and means for controlling the frequency of said variable frequency generating means in response to the digit output of the absorption cell whereby said algebraic sum corresponds to the minimum light output of the absorption cell and the frequency of said variable frequency generating means thereby indicating the magnetic field to be measured.

13. The apparatus of claim 12 wherein said means for controlling the frequency of said variable frequency generating means comprises a transducer for generating an electrical signal in response to the light output of said absorption cell impingent thereupon, a sweep generator and a phase detector connected to said transducer and to which the sweep signal is applied for detecting a phase difference between the sweep signal and a component of the sweep signal in the signal generated by said transducer, and means for generating a signal of variable frequency comprise a voltage controlled oscillator, the output frequency of which is controlled by the detected phase difference, and said sweep generator being further connected to said means for generating an FM signal to control said FM signal generating means.

* * * * *

UNITED STATES PATENT OFFICE
CERTIFICATE OF CORRECTION

Patent No. 3,728,614　　　　　Dated April 17, 1973

Inventor(s) Daniel P. Hearn

It is certified that error appears in the above-identified patent and that said Letters Patent are hereby corrected as shown below:

Column 6, line 26 "digit" should be -- light --;
　　　　　line 42 "and" should be -- said --;
　　　　　line 43 "comprise" should be -- comprises --.

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents